(12) United States Patent
Lu et al.

(10) Patent No.: US 11,863,684 B2
(45) Date of Patent: Jan. 2, 2024

(54) HARDWARE WALLET BINDING AUTHORIZATION METHOD AND APPARATUS

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 43 days.

(21) Appl. No.: 17/606,344

(22) PCT Filed: Jul. 15, 2020

(86) PCT No.: PCT/CN2020/102170
§ 371 (c)(1),
(2) Date: Oct. 25, 2021

(87) PCT Pub. No.: WO2021/047281
PCT Pub. Date: Mar. 18, 2021

(65) Prior Publication Data
US 2022/0231854 A1    Jul. 21, 2022

(30) Foreign Application Priority Data

Sep. 9, 2019  (CN) .......................... 201910849430.3

(51) Int. Cl.
  *H04L 9/40*  (2022.01)
  *H04L 9/32*  (2006.01)
  *H04L 9/08*  (2006.01)

(52) U.S. Cl.
  CPC .......... *H04L 9/3234* (2013.01); *H04L 9/0825* (2013.01); *H04L 9/0869* (2013.01);
  (Continued)

(58) Field of Classification Search
  CPC ... H04L 9/3234; H04L 9/0825; H04L 9/0869; H04L 9/0877; H04L 9/3226; H04L 9/3236
  See application file for complete search history.

(56) References Cited

U.S. PATENT DOCUMENTS 10,785,287 B2 *   9/2020   Prakash ................. H04L 67/01
2019/0123901 A1    4/2019   Vijayanarayanan
(Continued)

*Primary Examiner* — Thaddeus J Plecha
(74) *Attorney, Agent, or Firm* — Hammer & Associates, P.C.

(57) ABSTRACT

A hardware wallet binding authorization method. The method comprises: when a hardware wallet receives a binding state query instruction, determining the value of a verification data existence sign; if the value is first preset data, setting a binding object as null, and setting an authorization state as allowing generation of an authorization code; if the value is second preset data, setting the binding object as a terminal corresponding to the hardware wallet, or other terminals; returning the binding object and a saved hardware wallet certificate to the terminal; when the hardware wallet receives an authorization code generation instruction, if the authorization state is allowing generation of a state code, generating, caching and displaying an authorization code, setting the authorization state as not able to generate an authorization code again, and setting the state of the hardware wallet as unbound; and when the hardware wallet receives a binding instruction, using the acquired authorization code to verify the binding instruction, and if the verification is successful, binding being successful. The terminal can only be connected to the hardware wallet by means of user authorization, such that the security of user assets is ensured.

10 Claims, 4 Drawing Sheets

(52) U.S. Cl.
CPC .......... *H04L 9/0877* (2013.01); *H04L 9/3226* (2013.01); *H04L 9/3236* (2013.01)

(56) References Cited

U.S. PATENT DOCUMENTS

| | | | |
|---|---|---|---|
| 2020/0013052 A1* | 1/2020 | Fok | G06Q 20/367 |
| 2021/0049591 A1* | 2/2021 | Lamesh | G06Q 20/0655 |
| 2021/0264410 A1* | 8/2021 | Paek | H04L 9/0825 |

* cited by examiner

HARDWARE WALLET BINDING AUTHORIZATION METHOD AND APPARATUS

FIELD OF THE INVENTION

The present invention relates to a method for binding and authorizing a hardware wallet and a device thereof, which belong to the field of information security.

PRIOR ART

The hardware wallet is a device which is isolated from the internet and it stores a digital asset private key into a chip. In prior art, when trying to connect a hardware wallet for the first time, a terminal authenticates a matching code and a PIN code of the hardware wallet, and connects the hardware wallet when both the matching code and the PIN code authenticated successfully. Thus, when an illegitimate user, who gets the hardware wallet, gets the matching code and the PIN code, which means the hardware wallet could be connected the terminal successfully, the illegitimate user could use assets of a legitimate user, in this way, the assets of the legitimate user is not safe.

SUMMARY OF THE INVENTION

The object of the present invention is to provide a method and device for binding and authorizing a hardware wallet, which can protect user's assets if the hardware wallet is lost or unauthorized.

Thus, according to one aspect of the present invention, there is provided a method for binding and authorizing a hardware wallet which comprises:

Step S1, determining, by the hardware wallet, a type of an instruction when receiving the instruction sent from a terminal, executing Step S2 if the instruction is a checking binding state instruction; executing Step S5 if the instruction is a generating authorization code instruction; or executing Step S7 if the instruction is a binding instruction;

Step S2, determining, by the hardware wallet, a value of authenticating data existence flag stored in the hardware wallet, setting a binding object as null if the value is a first preset data, and setting an authorization state as permitting to generate authorization code, and executing Step S4; or executing Step S3 if the value is a second preset data;

Step S3, determining, by the hardware wallet, whether the authenticating data in the checking binding state instruction is the same as the stored authenticating data, if yes, setting the binding object as a terminal which is corresponding to the hardware wallet, and executing Step S4; otherwise, setting the binding object as the other terminal, and executing Step S4;

Step S4, organizing, by the hardware wallet, command response data according to the binding object and a stored hardware wallet certificate, and returning the command response data to the terminal, and returning to Step S1;

Step S5, determining, by the hardware wallet, whether the authorization state is the permitting generating state code, if yes, executing Step S6; otherwise, returning error information to the terminal, and returning to Step S1;

Step S6, generating, by the hardware wallet, an authorization code, caching and displaying the authorization code, setting the authorization state as "an authorization code cannot be generated", setting the hardware wallet state as unbinding, returning successful information to the terminal, and returning to Step S1;

Step S7, determining, by the hardware wallet, whether the hardware wallet state is unbinding, if yes, obtaining the cached authorization code, and executing Step S8; otherwise, obtaining the stored authorization code, and executing Step S10;

Step S8, authenticating, by the hardware wallet, the binding instruction by using the obtained authorization code, executing Step S9 if the binding instruction is authenticated successfully; returning authenticating unsuccessfully information to the terminal if the binding instruction is authenticated unsuccessfully, and returning to Step S1;

Step S9, storing, by the hardware wallet, the authenticating data in the binding instruction and caching the authorization code, setting the value of authenticating data existence flag as the second preset data, and returning authorization successful information to the terminal, and returning to Step S1;

Step S10, authenticating, by the hardware wallet, the binding instruction by using the obtained authorization code, and executing Step S11 if the binding instruction is authenticated successfully; returning the authentication unsuccessful information to the terminal if the binding instruction is authenticated unsuccessfully, and returning to Step S1; and Step S11, determining, by the hardware wallet, whether the terminal current connected is the terminal corresponding to the hardware wallet according to the binding instruction, if yes, returning authorization successful information to the terminal, and returning to Step S1; otherwise, storing the authenticated data in the binding instruction, setting the value of the authenticated data existence flag as the second preset data, and returning the authorization successful information to the terminal, and returning to Step S1.

Preferably, Step S9 and Step S11 further includes that the hardware wallet sets the binding state code between the hardware wallet and the terminal as a preset value;

Step S1 further includes that the hardware wallet determines whether the binding state code between the hardware wallet and the terminal when the hardware wallet determines the instruction sent from the terminal is a signing instruction, if yes, signing according to the signing instruction, and returning to Step S1; otherwise, returning error information to the terminal.

Preferably, before Step S2, the method further includes that the hardware wallet obtains the value of the authenticated data existence flag from the preset cache.

Preferably, the hardware wallet generating the authorization code comprises that the hardware wallet generates random number which is in a preset length, generating a retrieval code according to the random number and a preset character code table; and join values of the retrieval codes successively so as to obtain the authorization code.

Preferably, before Step S7, the method further includes that the hardware wallet determines whether the binding instruction is legitimate, if yes, executing Step S7; otherwise, returning the error information to the terminal, and returning to Step S1.

Preferably, the hardware wallet determines whether the binding instruction is legitimate specifically is that the hardware wallet determines whether data on the third byte of the binding instruction is a first preset value or a second preset value, and determining whether data on the fourth byte is a third preset value, if yes, the binding instruction is legitimate; otherwise, the binding instruction is illegitimate.

Preferably, Step S11 includes that the hardware wallet determines whether the data on the third byte in the binding instruction is the second preset value, if yes, returning the authorization successful information to the terminal, and returning to Step S1; otherwise, storing the authenticated data in the binding instruction, setting the value of the authenticated data existence flag as the second preset data, and returning the authorization successful information to the terminal, and returning to Step S1.

Preferably, setting the hardware wallet state as unbinding specifically is that the hardware wallet sets the authorization code mark as the preset value;

Step S7 includes that the hardware wallet determines whether the authorization code mark is the preset value, if yes, obtaining the cached authorization code, and executing Step S8; otherwise, obtaining the stored authorization code, and executing Step S10.

Preferably, the hardware wallet authenticating the binding instruction by using the obtained authorization code comprises that Step A1, the hardware wallet calculates on a terminal hash value cipher text in the binding instruction according to the authorization code to obtain a first decrypted result; and calculating to obtain a device hash value according to the authorization code, the authenticated data and a public key of the hardware wallet; and Step A2, the hardware wallet determines whether the device hash value equals to the first decrypted result, if yes, the authentication is successful; otherwise, the authentication is unsuccessful.

Preferably, Step A1 comprises:

Step b1, the hardware wallet operates hash algorithm on the authorization code to obtain a first hash result, operation hash algorithm on a preset constant to obtain a second hash result, and operating exclusive OR on the first hash result and the second hash result to obtain an exclusive OR result;

Step b2, the hardware wallet makes the first 16 bytes of the exclusive OR result as an initial vector of encryption and decryption; using the stored authenticated data and the public key of the hardware wallet to operate key consulting according to a key consulting algorithm to obtain a device cipher text and store the device cipher text, and making the first 16 bytes of the device cipher text as a first key;

Step b3, the hardware wallet decrypts the cipher text of the terminal hash value in the binding instruction by using the first key and the initial vector to obtain the first decrypted result; operating calculation according to the authorization code, the authenticated data, and the hardware wallet.

Preferably, obtaining the device hash value according to the authorization code, the authenticated data and the public key of the hardware wallet specifically is to join the authorization code, the authenticated data and the public key of the hardware wallet successively to obtain a joint value, executing hash operation on the joint value to obtain a device hash value.

According to the other aspect of the present invention, there is provided a device for binding authorizing a hardware wallet, which comprises:

a first determining module which is configured to determine a type of an instruction when the instruction is received by the hardware wallet from the terminal, to trigger a second determining module if the instruction is a checking binding state instruction; to trigger a third determining module if the instruction is a generating authorization code instruction; to trigger a fourth determining module if the instruction is a binding instruction;

the second determining module which is configured to determine a value of authenticating data exist flag which is stored in the device, and to set a binding object as null if the value of the authenticating data exist flag is a first preset data, and to set the authorization state as permitting to generate authorization code, and trigger a first returning module; and to trigger a determining and setting module if the value of the authenticating data exist flag is a second preset data;

the determining and setting module which is configured to determine whether the authenticating data in the checking binding state instruction is the same as the authenticating data stored in the device, if yes, to set the binding object as a terminal which corresponds to the hardware wallet, and to trigger a first returning module; otherwise, to set the binding object as other terminal, and to trigger the first returning module;

the first returning module which is configured to organize a command response according to the binding object and a stored hardware wallet certificate and return the command response to the terminal, and to trigger the first determining module;

the third determining module which is configured to determine whether the authorization state is permitting to generate state code, if yes, to trigger a generating and setting module; otherwise, to return error information to the terminal and to trigger the first determining module;

the generating and setting module which is configured to generate, cache and display the authorization code, and to set the authorization state as cannot generate authorization code again, and set the hardware wallet state as unbinding, and to return successful information to the terminal, and to trigger the first determining module;

the fourth determining module which is configured to determine whether the hardware wallet state is unbinding, if yes, to obtain the cached authorization code, and to trigger a first authenticating module; otherwise, to obtain the stored authorization code, and to trigger a second authenticating module;

the first authenticating module which is configured to authenticate the binding instruction by using the obtained authorization code, and to trigger a storing and setting module if the binding instruction is authenticated successfully; and to return authenticating unsuccessful information to the terminal if the binding instruction is authenticated unsuccessfully, and to trigger the first determining module;

the storing and setting module which is configured to store authenticating data and cached authorization code, and to set the value of the authenticating data existence flag as the second preset data, and to return authorization successful information to the terminal, and to trigger the first determining module;

the second authenticating module which is configured to authenticate the binding instruction by using the obtained authorization code, to trigger a determining and storing module if the binding instruction is authenticated successfully; and to return authenticating unsuccessful information if the binding instruction is authenticated unsuccessfully, and to trigger the first determining module;

the determining and storing module which is configured to determine whether the terminal currently connected is the terminal which corresponds to the hardware wallet according to the binding instruction, if yes, to return authorization successful information to the terminal, and to trigger the first determining module; otherwise, to store the authenticating data in the binding instruction, and to set the value of the authenticating data existence flag as the second preset data, and to return authorization successful information to the terminal, and to trigger the first determining module.

Preferably, the storing and setting module is further configured to set the binding state between the hardware wallet and the terminal as the preset value;

the device further include a determining and signing module which is configured to determine whether the state code of the hardware wallet binding with the terminal is a preset value when the first determining module determines instruction sent from the terminal is a signing instruction, if yes, to execute signature operation according to the signing instruction, and to trigger the first determining module; otherwise, to return error information to the terminal, and to trigger the first determining module.

Preferably, the device further includes a first obtaining module which is configured to obtain the value of the authenticating data existence flag from the preset cache.

Preferably, that the generating and setting module is configured to generate the authorization code includes that the generating and setting module is configured to generate a random number of a preset length, and generate a retrieval code according to the random number and a preset character coding table, and join successively values of the retrieval codes to obtain the authorization code.

Preferably, the device further includes a fifth determining module which is configured to determine whether the binding instruction is legitimate when the first determining module determines that the instruction is the binding instruction, if yes, to trigger the fourth determining module; otherwise, return error information to the terminal, and to trigger the first determining module.

Preferably, the fifth determining module is specifically configured to determine whether data on the third byte of the binding instruction is a first preset value or a second preset value, and determine whether data on the fourth byte is a third preset value, if yes, to trigger the fourth determining module; otherwise, return error information to the terminal, and to trigger the first determining module.

Preferably, the determining and storing module is specifically configured to determine the data on the third byte of the binding instruction is the second preset value, if yes, to return the authorization successful information to the terminal; otherwise, to store the authenticating data in the binding instruction, and set the value of authenticating data existence flag as the second preset data, and to return the authorization successful information to the terminal, and to trigger the first determining module.

Preferably, the generating and setting module configured to set the state of the hardware wallet as unbinding specifically is the generating and setting module configured to set the authorization code mark as the preset value;

the fourth determining module is specifically configured to determine the authorization code mark as the preset value, if yes, obtain the cached authorization code, and trigger the first authenticating module; otherwise, obtain the stored authorization code, and trigger the second authenticating module.

Preferably, the first authenticating module includes:

a calculating unit which is configured to calculate on terminal hash value in the binding instruction according to the authorization code to obtain a first decrypting result; and to calculate according to the authorization code, the authenticating data, the public key of the hardware wallet to obtain the device hash value; and a first determining unit which is configured to determine whether the device hash value equals the first decrypting result, if yes, be authenticated successfully, to trigger the storing and setting module; otherwise, be authenticated unsuccessfully, to return authenticating unsuccessful information to the terminal, and to trigger the first determining module;

the second authenticating module includes:

the calculating unit which is configured to calculate on terminal hash value in the binding instruction according to the authorization code to obtain a first decrypting result; and to calculate according to the authorization code, the authenticating data, the public key of the hardware wallet to obtain the device hash value; and a second determining unit which is configured to determine whether the device hash value equals the first decrypting result, if yes, authentication is successfully, to trigger the determining and storing module; otherwise, the authentication fails, to return authenticating unsuccessful information to the terminal, and to trigger the first determining module.

Preferably, the calculating unit includes:

a first calculating sub-unit which is configured to operate hash calculation on the authorization code to obtain a first hash result, and operate hash calculation on a preset constant to obtain a second hash result, and to operate xor calculation on the first hash result and the second hash result to obtain a xor result;

a decrypting and consulting sub-unit which is configured to make the first 16 bytes of the xor result as an initial vector of a decryption; operate key consultation by using the stored authenticating data and the public key of the hardware wallet according to a key consultation algorithm to obtain and store a device cipher text, and make the first 16 bytes of the device cipher text as the first key;

a decrypting and calculating sub-module which is configured to decrypt a cipher text of the terminal hash value in the binding instruction by using the first key and the initial vector to obtain a first decrypted result; and to calculate according to the authorization code, the authenticating data, the public key of the hardware wallet to obtain the device hash value.

Preferably, the decrypting and calculating sub-unit configured to calculate according to the authorization code, the authenticating data, and the public key of the hardware wallet to obtain the device hash value specifically is that the decrypting and calculating sub-unit is configured to join successively the authorization code, the authenticating data, and the public key of the hardware wallet to obtain a joint value, and to operate hash calculation on the joint value to obtain the device hash value.

According to the preset disclosure, a terminal needs to bind one corresponding hardware wallet; when the hardware wallet needs to connect with a new terminal, it should determine whether a user authorizes the new terminal to connect with the hardware via an authorization code, if yes, it permits the new terminal to connect with the hardware wallet; in this way, the user's assets is protected when the hardware wallet is lost or a terminal, which is unauthorized, wants to connect with the hardware wallet.

EMBODIMENTS FOR CARRYING OUT THE INVENTION

The technical solution in the Embodiments of the present invention is further described more clearly and completely together with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
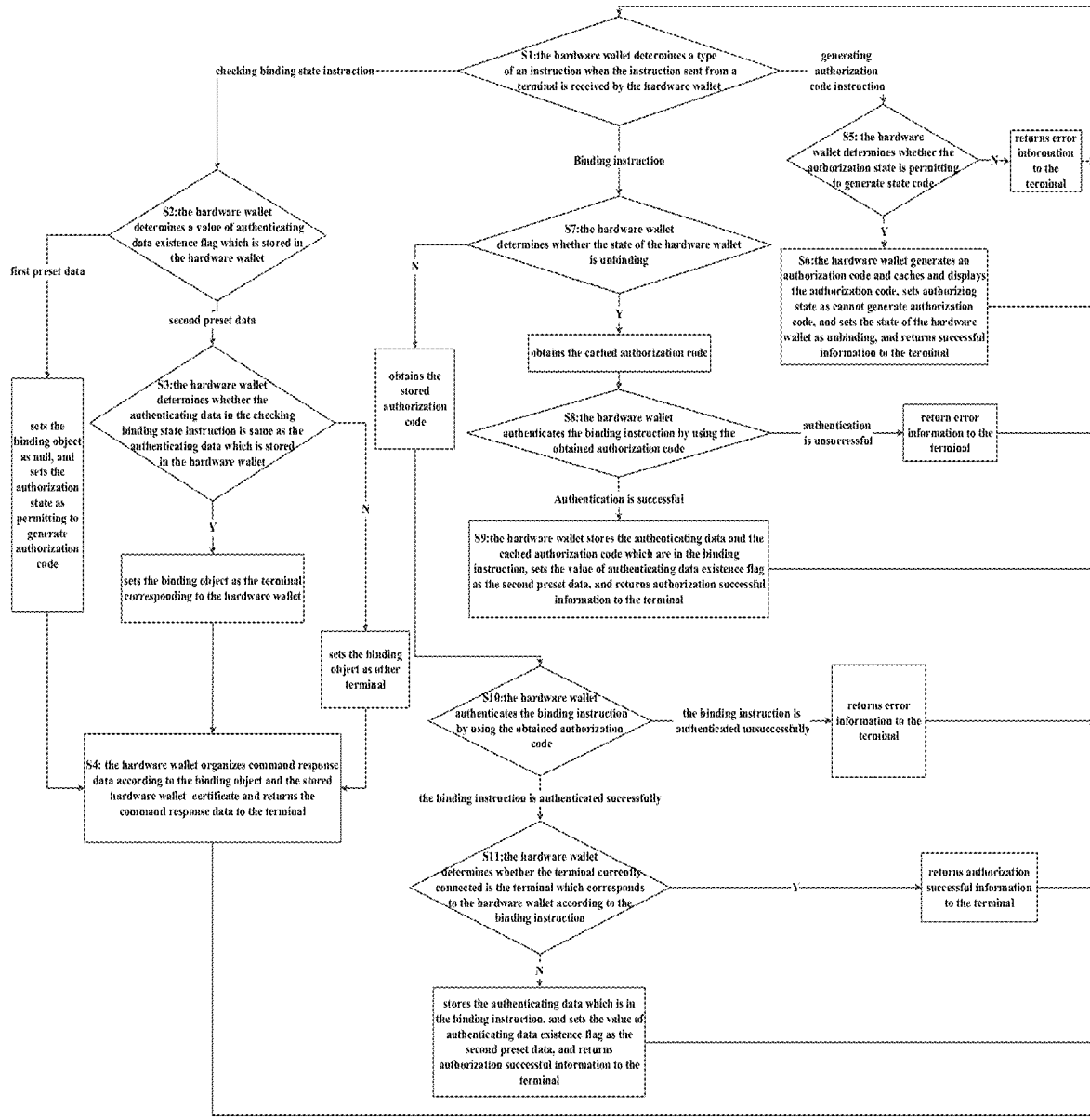
FIG. 1 is a flow diagram of a method for binding and authorizing a hardware wallet according to Embodiment 1 of the present invention.

It provides a method for binding and authorizing a hardware wallet according to Embodiment 1 of the present invention. As shown in FIG. 1, the method includes the following steps.

Step S1, the hardware wallet determines a type of an instruction when the instruction sent from a terminal is received by the hardware wallet, executes Step S2 if the instruction is a checking and binding state instruction; executes Step S5 if the instruction is a generating authorization code instruction; executes Step S7 if the instruction is a binding instruction.

Step S2, the hardware wallet determines a value of authenticating data existence flag which is stored in the hardware wallet, sets a binding object as null if the value of authenticating data existence flag is a first preset data, and sets authorization state as permitting to generate authorization code, and executes Step S4; executes Step S3 if the value of authenticating data existence flag is a second preset data.

Preferably, in Embodiment 1, before Step S2 the method further includes the hardware wallet obtains the value of authenticating data existence flag from a preset cache.

Step S3, the hardware wallet determines whether the authenticating data in the checking binding state instruction is the same as the authenticating data which is stored in the hardware wallet, if yes, sets the binding object as a corresponding terminal of the hardware wallet, and executes Step S4; otherwise, sets the binding object as other terminal, and executes Step S4.

Preferably, the authenticating date in Embodiment 1 may be a public key of terminal or other data.

Step S4, the hardware wallet organizes response data according to the binding object and a hardware wallet certificate which is stored in the hardware wallet, and returns the response data to the terminal, and returns to Step S1.

Step S5, the hardware wallet determines whether the authorization state is permitting to generate state code, if yes, executes Step S6; otherwise, returns error information to the terminal, and returns to Step S1.

Step S6, the hardware wallet generates an authorization code and caches and displays the authorization code, sets authorizing state as cannot generate authorization code, and sets the state of the hardware wallet as unbinding, and returns successful information to the terminal, and returns to Step S1.

Specifically, in Embodiment 1, the hardware wallet generating the authorization code includes that the hardware wallet generating a random number of a preset length, and generating a retrieval code according to the random number and a preset character coding table, and joining the retrieval code successively to obtain the authorization code.

Preferably, setting the state of the hardware wallet as unbinding specifically is that the hardware wallet sets an authorization code mark as a preset value;

Step S7, the hardware wallet determines whether the state of the hardware wallet is unbinding, if yes, obtains the cached authorization code, and executes Step S8; otherwise, obtains the stored authorization code, and executes Step S10.

Specifically, Step S7 includes that the hardware wallet determines whether the authorization code mark is the preset value, if yes, obtains the cached authorization code, and executes Step S8; otherwise, obtains the stored authorization code, and executes Step S10.

Preferably, before Step S7, the method further includes that the hardware wallet determines whether the binding instruction is legitimate, if yes, executes Step S7; otherwise, returns error information to the terminal, and returns to Step S1, in which the hardware wallet determining whether the binding instruction is legitimate specifically is that the hardware wallet determines whether data on the third byte in the binding instruction is a first preset value or a second preset value, and determines whether data on the fourth byte is a third preset value, if yes, the binding instruction is legitimate; otherwise, the binding instruction is not legitimate.

Step S8, the hardware wallet authenticates the binding instruction by using the obtained authorization code, executes Step S9 if the binding instruction is authenticated successfully; and returns unsuccessful information to the terminal if the binding instruction is authenticated unsuccessfully, and returns to Step S1.

Specifically, in Embodiment 1, the hardware wallet authenticating the binding instruction by using the obtained authorization code includes the following steps.

Step A1, the hardware wallet calculates on cipher text of the terminal hash value in the binding instruction according to the authorization code to obtain a first decrypted result; and calculates according to the authorization code, the authenticating data, and the public key of hardware wallet to obtain a device hash value.

In Embodiment 1, Step A1 includes that step b1, the hardware wallet operates hash algorithm on the authorization code to obtain a first hash result, operates hash algorithm on a preset constant to obtain a second hash result, and executes xor algorithm on the first hash result and the second hash result to obtain a xor result;

step b2, the hardware wallet makes the first 16 bytes of the xor result as an initial vector of the encryption or the decryption; operates key consultation by using the stored authenticating data and the public key of hardware wallet according to key consultation algorithm to obtain the device cipher text and stores the device cipher text, and makes data on the first 16 bytes of the device cipher text as the first key;

for instance, in Embodiment 1, the hardware wallet makes the first 16 bytes of the xor result as the initial vector of AES encryption;

step b3, the hardware wallet decrypts the cipher text of the terminal hash value in the binding instruction by using the first key and the initial vector to obtain the first decrypted result; and calculates according to the authorization code, the authenticating data and the public key of hardware wallet to obtain the device hash value.

In Embodiment 1, calculating according to the authorization code, the authenticating data and the public key of hardware wallet to obtain the device hash value specifically is that joining the authorization code, the authenticating data and the public key of hardware wallet successively to obtain a joint value, and operating hash algorithm on the joint value so as to obtain the device hash value.

Step A2, the hardware wallet determines whether the device hash value equals the first decrypted result, if yes, the authentication is successful; otherwise, the authentication is unsuccessful.

Step S9, the hardware wallet stores the authenticating data and the cached authorization code which are in the binding instruction, sets the value of authenticating data existence flag as the second preset data, and returns authorization successful information to the terminal, and returns to Step S1.

Step S10, the hardware wallet authenticates the binding instruction by using the obtained authorization code, executes Step S11 if the binding instruction is authenticated successfully; returns authentication unsuccessful information to the terminal if the binding instruction is authenticated unsuccessfully, and returns to Step S1.

In Embodiment 1, realization of Step S10 is the same as Step S8, details will not be given herein.

Step S11, the hardware wallet determines whether the terminal currently connected is the terminal which corresponds to the hardware wallet according to the binding instruction, if yes, returns authorization successful information to the terminal, and returns to Step S1; otherwise, stores the authenticating data which is in the binding instruction, and sets the value of authenticating data existence flag as the second preset data, and returns authorization successful information to the terminal, and returns to Step S1.

In Embodiment 1, Step S11 includes that the hardware wallet determines whether the data on the third byte of the binding instruction is the second preset value, if yes, returns authorization successful information to the terminal, and returns to Step S1; otherwise, stores the authenticating data which is in the binding instruction, sets the value of authenticating data existence flag as the second preset value, and returns authorization successful information to the terminal, and returns to Step S1.

Preferably, in Embodiment 1, the user can use the hardware wallet in the case that authorization is successful, the user's operation includes signature, etc. that means the Step S9 and the Step S11 further include that the hardware wallet sets the binding state code between the hardware wallet and the terminal as the preset value; correspondingly, Step S1 further includes that the hardware wallet determines whether the binding state code between the hardware wallet and the terminal is the preset value when the received instruction sent from the terminal is a signing instruction, if yes, signs according the signing instruction, and returns to Step S1; otherwise, returns error information to the terminal.

Embodiment 2

Figure 2:
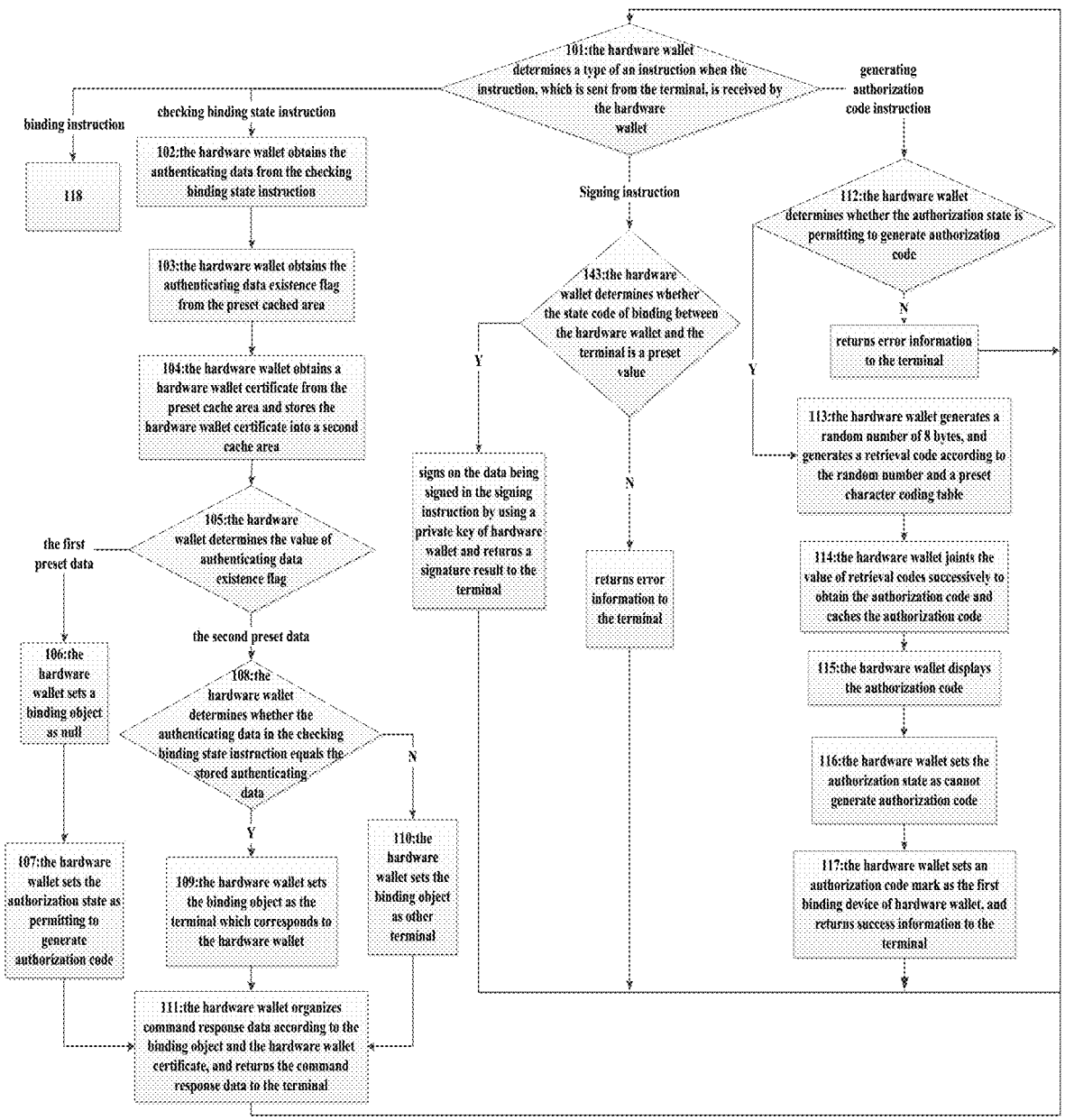
FIG. 2 and FIG. 3 are flow diagrams of a method for binding and authorizing a hardware wallet according to Embodiment 2 of the present invention.
Figure 3:
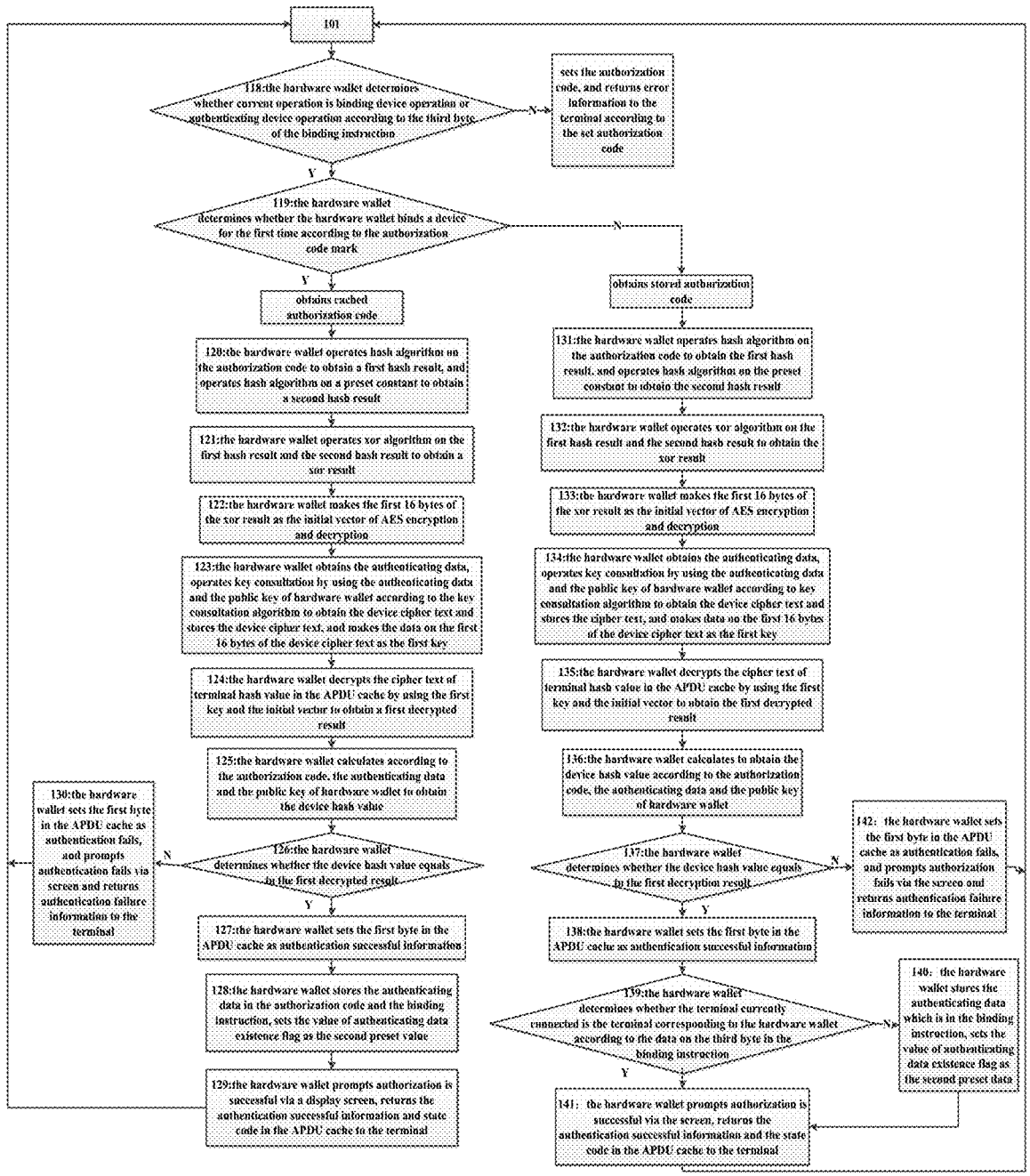

According to Embodiment 2 of the present invention, it provides a method for binding and authorizing a hardware wallet. As shown in FIG. 2 and FIG. 3, the method includes the following steps.

Step 101, the hardware wallet determines a type of an instruction when the instruction, which is sent from the terminal, is received by the hardware wallet, executes Step 102 if the instruction is a checking and binding state instruction; executes Step 112 if the instruction is a generating authorization code instruction; executes Step 118 if the instruction is a binding instruction; executes Step 143 if the instruction is a signing instruction.

Specifically, in Embodiment 2, the hardware wallet determines data on the second byte of the received instruction, the instruction is the checking and binding state instruction if the data is 0x71; the instruction is the generating authorization code instruction if the data is 0x72; the instruction is the binding instruction if the data is 0x73.

In Embodiment 2, the hardware wallet stores the instruction in the APDU cache if the instruction is received, and processes the instruction.

Step 102, the hardware wallet obtains the authenticating data from the checking and binding state instruction.

Specifically, in Embodiment 2, Step 102 includes that the hardware wallet stores the received checking and binding state instruction into APDU cache, and obtains data of 65 bytes from the fifth byte which is cached in APDU as the authenticating data, and stores the authenticating data in the first cache area; for instance, the authenticating data in Embodiment 2 may be the terminal public key.

Step 103, the hardware wallet obtains the authenticating data existence flag from the preset cached area.

Preferably, in Embodiment 2, before Step 103, the method further includes that the hardware wallet determines whether there is data in the preset cache area, if yes, executes Step 103; otherwise, reports an error.

Step 104, the hardware wallet obtains a hardware wallet certificate from the preset cache area and stores the hardware wallet certificate into a second cache area.

In Embodiment 2, the hardware wallet certificate includes the public key of hardware wallet.

Step 105, the hardware wallet determines the value of authenticating data existence flag, and executes Step 106 if the value of authenticating data existence flag is the first preset data; while executes Step 108 if the value of authenticating data existence flag is the second preset data.

Preferably, the first preset data is 0x0000, the second preset data is 0x5AA5.

Step 106, the hardware wallet sets a binding object as null.

For instance, in Embodiment 2, the hardware wallet sets a value of the binding object as 0x00.

Step 107, the hardware wallet sets the authorization state as permitting to generate authorization code, and executes Step 111.

In Embodiment 2, the hardware wallet sets the authorization state as 0xA5.

Step 108, the hardware wallet determines whether the authenticating data in the checking and binding state instruction equals the stored authenticating data, if yes, executes Step 109; otherwise, executes Step 110.

Step 109, the hardware wallet sets the binding object as the terminal which corresponds to the hardware wallet, and executes Step 111.

For instance, in Embodiment 1, the hardware wallet sets the value of the binding object as 0x55.

Step 110, the hardware wallet sets the binding object as other terminal, and executes Step 111.

For instance, in Embodiment 2, the hardware wallet sets the value of binding object as 0xAA.

Step 111, the hardware wallet organizes command response data according to the binding object and the hardware wallet certificate, and returns the command response data to the terminal, and returns to Step 101.

In Embodiment 2, the terminal obtains the value of binding object from the received response data, the hardware wallet has not bond with a new device if the value of binding object is 0x00, and the device sends the binding instruction to the hardware wallet device; the device bond by the hardware wallet is the current device if the value of binding instruction is 0x55; the hardware wallet binds the other terminal if the value of binding instruction is 0xAA, and the terminal sends the generating authorization code instruction to the hardware wallet.

In Embodiment 2, in the case that after receiving the response data, the terminal parses the response data to gets that the binding object is null, the terminal sends the generating authorization code instruction to the hardware wallet; in the case that parsing the response data to get that the binding object is the terminal corresponding to the hardware wallet or other terminal, sends the binding instruction to the hardware wallet.

Step 112, the hardware wallet determines whether the authorization state is permitting to generate authorization code, if yes, executes Step 113; otherwise, returns error information to the terminal.

For instance, in Step 112, the hardware wallet determines whether the authorization state is 0xA5, if yes, executes Step 113; otherwise, returns error information to the terminal; preferably, the error information is 9000.

Step 113, the hardware wallet generates a random number of 8 bytes, and generates a retrieval code according to the random number and a preset character coding table.

In Embodiment 2, the hardware wallet generating the retrieval code according to the random number and the preset character coding table includes that the hardware wallet executes module on the character code in the preset character coding table which corresponding to the nth byte of the random number and 32 to obtain an index and makes the index as a retrieval code of SEED; the preset character coding table is the following 32 character codes RANDOM_SEED(0~9, A~Z except 0,1,I, and O).

Step 114, the hardware wallet joins the value of retrieval codes successively to obtain the authorization code and caches the authorization code.

In Embodiment 2, after the authorization code is cached, the cached authorization code will be cleared if the power fails.

Step 115, the hardware wallet displays the authorization code.

In Embodiment 2, the user records the authorization code which is displayed by the hardware wallet on the paper, and stores the authorization code safely, when the hardware wallet binds the current device or other device, the user enters the authorization code which is stored into the terminal, and the terminal calculates on the terminal data according to the authorization code and sends the terminal data to the hardware wallet, and the hardware wallet authenticates the received terminal data via the cached authorization or the stored authorization code.

Step 116, the hardware wallet sets the authorization state as cannot generate authorization code.

For instance, in Embodiment 2, Step 116 sets the authorization state as 0x5A.

Step 117, the hardware wallet sets an authorization code mark as the first binding device of hardware wallet, and returns success information to the terminal, and returns to Step 101.

Specifically, in Embodiment 2, the hardware wallet sets the authorization code mark as 0xA5.

Step 118, the hardware wallet determines whether current operation is binding device operation or authenticating device operation according to the third byte of the binding instruction, if yes, executes Step 119; otherwise, sets the authorization code, and returns error information to the terminal according to the set authorization code.

Preferably, Step 118 further includes that the hardware wallet determines whether the data on the fourth byte of the binding instruction is 0.

Specifically, the hardware wallet determines the value of the third byte of the binding instruction, the terminal executes binding device operation or authenticating device operation if the value of the third byte of the binding instruction is 0x00 or 0x80; the set state code is 6a86, that means values of P1 and P2 are wrong.

Step 119, the hardware wallet determines whether the hardware wallet binds a device for the first time according to the authorization code mark, if yes, obtains the cached authorization code, and executes Step 120; otherwise, obtains the stored authorization code, and executes Step 131.

Specifically, in Embodiment 2, the hardware wallet determines whether the authorization code mark is 0xA5, if yes, uses the cached authorization code directly, and executes Step 120; otherwise, obtains the stored authorization code, and executes Step 120; in Embodiment 2, the stored authorization code can be used when the hardware wallet turns on for the next time in the case that the authorization is stored before the power is down.

Step 120, the hardware wallet operates hash algorithm on the authorization code to obtain a first hash result, and operates hash algorithm on a preset constant to obtain a second hash result.

For instance, the preset constant in Embodiment 2 is 0x62 0x69 0x6e 0x64 0x69 0x6e 0x67 0x43 0x6f 0x64 0x65.

Step 121, the hardware wallet operates xor algorithm on the first hash result and the second hash result to obtain a xor result.

Step 122, the hardware wallet makes the first 16 bytes of the xor result as the initial vector of AES encryption and decryption.

Step 123, the hardware wallet obtains the authenticating data, operates key consultation by using the authenticating data and the public key of hardware wallet according to the key consultation algorithm to obtain the device cipher text and stores the device cipher text, and makes the data on the first 16 bytes of the device cipher text as the first key.

Preferably, the hardware wallet makes data on bytes from the sixth byte to the 70$^{th}$ byte in the APDU cache as the authenticating data; the key consultation algorithm specifically is ECDH.

In Embodiment 2, the sequence of Step 122 and Step 123 can be exchanged.

Step 124, the hardware wallet decrypts the cipher text of terminal hash value in the APDU cache by using the first key and the initial vector to obtain a first decrypted result.

Specifically, the cipher text of terminal hash value is on the bytes of 32 bytes after the 70$^{th}$ byte in the APDU cache.

Step 125, the hardware wallet calculates according to the authorization code, the authenticating data and the public key of hardware wallet to obtain the device hash value.

In Embodiment 2, calculating to obtain the device hash value specifically is joining the authorization code, the authenticating data and the public key of hardware wallet successively to obtain a joint value, and operates hash algorithm on the joint value to obtain the device hash value.

In Embodiment 2, the sequence of Step 124 and Step 125 can be exchanged.

Step 126, the hardware wallet determines whether the device hash value equals to the first decrypted result, if yes, executes Step 127; otherwise, executes Step 130.

Step 127, the hardware wallet sets the first byte in the APDU cache as authentication successful information.

Specifically, the hardware wallet sets the first byte in the APDU cache as 0x5A. Step 128, the hardware wallet stores the authenticating data in the authorization code and the binding instruction, sets the value of authenticating data existence flag as the second preset value, and executes Step 129.

Specifically, in Embodiment 2, the value of authenticating data existence flag as 0x5AA5.

Step 129, the hardware wallet prompts authorization is successful via a display screen, returns the authentication successful information and state code in the APDU cache to the terminal, and returns to Step 101.

Specifically, the hardware wallet prompting authorization is successful is that the hardware wallet displays on the screen that authorization successful information.

For instance, the state code in Embodiment 2 is 9000.

Step 130, the hardware wallet sets the first byte in the APDU cache as authentication fails, and prompts authentication fails via screen and returns authentication failure information to the terminal, and returns to Step 101.

In Embodiment 2, that the hardware wallet sets the first byte in the APDU cache as authentication successful is specifically that the value of authenticating data existence flag is set as 0x5AA5.

Specifically, the hardware prompting via screen that authorization fails is that the hardware wallet displays on the screen that authorization failure information.

Step 131, the hardware wallet operates hash algorithm on the authorization code to obtain the first hash result, and operates hash algorithm on the preset constant to obtain the second hash result.

For instance, the preset constant in Embodiment 2 is 0x62 0x69 0x6e 0x64 0x69 0x6e 0x67 0x43 0x6f 0x64 0x65.

Step 132, the hardware wallet operates xor algorithm on the first hash result and the second hash result to obtain the xor result.

Step 133, the hardware wallet makes the first 16 bytes of the xor result as the initial vector of AES encryption and decryption.

Step 134, the hardware wallet obtains the authenticating data, operates key consultation by using the authenticating data and the public key of hardware wallet according to key consultation algorithm to obtain the device cipher text and stores the cipher text, and makes data on the first 16 bytes of the device cipher text as the first key.

Preferably, the hardware wallet makes the data on bytes from the sixth byte to 70$^{th}$ byte in the APDU cache as the authenticating data; the key consultation algorithm specifically is ECDH.

In Embodiment 2, the sequence of Step 133 and Step 134 can be exchanged.

Step 135, the hardware wallet decrypts the cipher text of terminal hash value in the APDU cache by using the first key and the initial vector to obtain the first decrypted result.

Specifically, the cipher text of terminal hash value is 32 bytes after the 70$^{th}$ byte in the APDU cache.

Step 136, the hardware wallet calculates to obtain the device hash value according to the authorization code, the authenticating data and the public key of hardware wallet.

In Embodiment 2, calculating to obtain the device hash value specifically is that joining the authorization code, the authenticating data and the public key of hardware wallet successively to obtain the joint value, and operates hash algorithm on the joint value to obtain the device hash value.

In Embodiment 2, the sequence of Step 136 and Step 137 can be exchanged.

Step 137, the hardware wallet determines whether the device hash value equals to the first decryption result, if yes, executes Step 138; otherwise, executes Step 142.

Step 138, the hardware wallet sets the first byte in the APDU cache as authentication successful information.

Specifically, the hardware wallet sets the first byte in the APDU cache as 0x5A. Step 139, the hardware wallet determines whether the terminal currently connected is the terminal corresponding to the hardware wallet according to the data on the third byte in the binding instruction, if yes, executes Step 141; otherwise, executes Step 140.

Specifically, the hardware wallet determines whether the data on the third byte in the binding instruction is 0x80, if yes, the terminal currently connected is the terminal corresponding to the hardware wallet; otherwise, the terminal currently connected is not the terminal corresponding to the hardware wallet.

Step 140, the hardware wallet stores the authenticating data which is in the binding instruction, sets the value of authenticating data existence flag as the second preset data, and executes Step 141.

Specifically, in Embodiment 2, the value of authenticating data existence flag is set as 0x5AA5.

Step 141, the hardware wallet prompts authorization is successful via the screen, returns the authentication successful information and the state code in the APDU cache to the terminal, and returns to Step 101.

Specifically, the hardware wallet prompting authorization is successful via the screen is that the hardware wallet displays authorization successful information on the screen.

For instance, the state code in Embodiment is 9000.

Step 142, the hardware wallet sets the first byte in the APDU cache as authentication fails, prompts authorization fails via the screen, and returns authentication failure information to the terminal, then returns to Step 101.

In Embodiment 2, that the hardware wallet sets the first byte in the APDU cache as authentication is successful specifically is that the hardware wallet sets the data on the first byte in the APDU cache as 0xA5.

Specifically, that the hardware wallet prompts that authentication fails is the hardware wallet displays authorization failure information on the screen.

Step 143, the hardware wallet determines whether the state code of binding between the hardware wallet and the terminal is a preset value, if yes, signs on the data being signed in the signing instruction by using a private key of hardware wallet and returns a signature result to the terminal, and returns to Step 101; otherwise, returns error information to the terminal, and returns to Step 101.

In the present invention, one terminal correspondingly binds one hardware wallet, the hardware wallet must determine whether a user permits the hardware wallet to connect to the terminal via an authorization code when the hardware wallet needs to connect to the terminal, if yes, the hardware wallet connects to the terminal, in this way, the user's asset is safer in the case that hardware wallet is lost.

Embodiment 3

Figure 4:
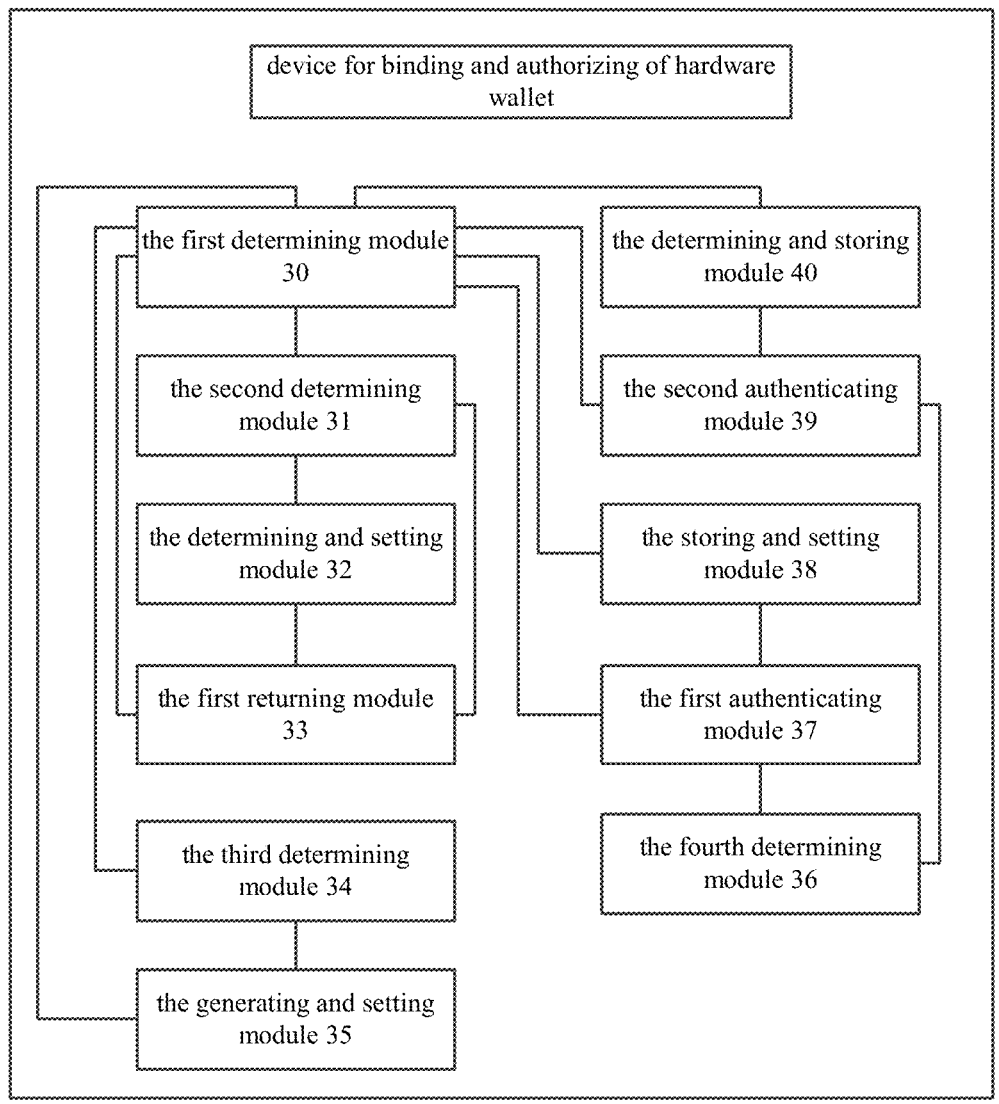
FIG. 4 is a block diagram of a device for binding and authorizing a hardware wallet according to Embodiment 3 of the present invention.

According to Embodiment 3, it provides a device for binding and authorization a hardware wallet. As shown in FIG. 4, the device includes:

a first determining module 30 which is configured to determine a type of instruction when the hardware wallet receives the instruction sent from a terminal, and to trigger a second determining module 31 if the instruction is a checking and binding state instruction; to trigger a third determining module 34 if the instruction is a generating authorization code instruction; and to trigger a fourth determining module 36 if the instruction is a binding instruction;

the second determining module 31 which is configured to determine a value of authenticating data existence flag which is stored in the hardware wallet, and to set a binding object as null if the value of authenticating data existence flag is a first preset data, and to trigger a first returning module 33; otherwise, to trigger a determining and setting module 32;

the determining and setting module 32 which is configured to determine whether authenticating data in the checking and binding state instruction is the same as stored authenticating data, if yes, to set the binding object as a terminal corresponding to the hardware wallet, and to trigger a first returning module 33; otherwise, to set the binding object as other terminal, and trigger the first returning module 33;

the first returning module 33 which is configured to organize command response data according to the binding object and a stored hardware wallet certificate and to return the command response data to the terminal, and to trigger the first determining module 30;

the third determining module 34 which is configured to determine whether the authorizing state is permitting to generate state code, if yes, to trigger a generating and setting module 35; otherwise, to return error information to the terminal, and to trigger the first determining module 30;

the generating and setting module 35 which is configured to generate an authorization code, cache and display the authorization code, set the authorizing state as cannot generate authorization code anymore, set the state of hardware wallet as unbinding, and return successful information to the terminal, and to trigger the first determining module 30;

specifically, in Embodiment 3, the generating and setting module 35 configured to generate authorization code includes that the generating and setting module 35 is configured to generate a random number of a preset length, and generate retrieval code according to the random number and a preset coding table; and join the retrieval codes successively to consist the authorization code;

a fourth determining module 36 which is configured to determine whether the state of hardware wallet is unbinding, if yes, to obtain the cached authorization code, and to trigger a first authenticating module 37; otherwise, to obtain the stored authorization code, and to trigger a second authenticating module 39;

the first authenticating module 37 which is configured to authenticate the binding instruction by using the obtained authorization code, and to trigger a storing and setting module 38 if the binding instruction is authenticated successfully; and to return authentication unsuccessful information to the terminal if the binding instruction is authenticated unsuccessfully, and to trigger the first determining module 30;

the storing and setting module 38 which is configured to store the authenticating data and the cached authorization code which are in the binding instruction, set the value of authenticating data existence flag as the second preset data, and to return authorization successful information to the terminal, and to trigger the first determining module 30;

the second authenticating module 39 which is configured to authenticate the binding instruction by using the obtained authorization code, to trigger a determining and storing module 40 if the binding instruction is authenticated successfully; return authentication unsuccessfully information to the terminal if the binding instruction is authenticated unsuccessfully, and to trigger the first determining module 30; and the determining and storing module 40 which is configured to determine whether the terminal currently connected is the terminal corresponding to the hardware wallet according to the binding instruction, if yes, to return authorization successful information to the terminal, and to trigger the first determining module 30; otherwise, to store the authenticating data which is in the binding instruction, and to set the value of authenticating data existence flag as the second preset data, and return authorization successful information to the terminal, and to trigger the first determining module 30.

In Embodiment 3, the storing and setting module 38 is further configured to set the binding state between the hardware wallet and the terminal as the preset value.

Correspondingly, the device further includes a determining and signing module which is configured to determine whether the state code between the hardware wallet and the terminal as the preset value when the first determining module 30 determines the received instruction sent from the terminal is the signing instruction, if yes, execute signature operation according to the signing instruction, and to trigger the first determining module; otherwise, return error information to the terminal, and to trigger the first determining module.

In Embodiment 3, the device further includes a first obtaining module which is configured to obtain the value of authenticating data existence flag from the preset cache.

In Embodiment 3, the device further includes a fifth determining module which is configured to determine whether the binding instruction is legitimate when the first determining module 30 determines the instruction is the binding instruction, if yes, to trigger the fourth determining module 36; otherwise, return error information to the terminal, and to trigger the first determining module 30.

In Embodiment 3, the fifth determining module specifically configured to determine whether data on the third byte in the binding instruction is the first preset value or the second preset value, and to determine data on the fourth byte is the third preset value when the first determining module 30 determines that the instruction is the binding instruction, if yes, to trigger the fourth determining module 36; otherwise, return error information to the terminal, and to trigger the first determining module 30.

In Embodiment 3, the determining and storing module 40 is specifically configured to determine whether data on the third byte in the binding instruction is the second preset value, if yes, to return authorization-has-been-successful information to the terminal; otherwise, store the authenticating data which is in the binding instruction, and set the value of authenticating data existence flag as the second preset data, and return authorization successful information to the terminal, and to trigger the first determining module.

Preferably, the generating and setting module 35 which is configured to set the state of hardware wallet as unbinding specifically is that the generating and setting module 35 is configured to set the authorization code mark as the preset value; the fourth determining module 36 is specifically configured to determine the authorization code mark is the preset value, if yes, obtain the cached authorization code, and to trigger the first authenticating module 37; otherwise, to obtain the stored authorization code, and to trigger the second authenticating module 39.

Specifically, in Embodiment 3, the first authenticating module 37 includes: a calculating unit which is configured to calculate on the cipher text of the terminal hash value in the binding instruction according to the authorization code to obtain the first decrypted result; calculate according to the authorization code, the authenticating data and the public key of hardware wallet to obtain the device hash value, in which, the calculating unit includes:
  a first calculating sub-unit which is configured to calculate on the authorization code to obtain the first hash result, operate hash algorithm on the preset constant to obtain the second hash result, operate xor algorithm on the first hash result and the second hash result to obtain the xor result;
  a decrypting and consulting sub-unit which is configured to make the first 16 bytes of the xor result as the initial vector of the decryption; operate key consultation by using the stored authenticating data and the public key of hardware wallet according to the key consultation algorithm to obtain the cipher text of device and stores the cipher text of device, and make the data of first 16 bytes of the cipher text of device as the first key;
  for instance, in Embodiment 3, the decrypting and consulting sub-unit is configured to make the first bytes of xor result as the initial vector of AES encryption;
  a decrypting and calculating sub-unit which is configured to decrypt the cipher text of terminal hash value in the binding instruction by using the first key and the initial vector to obtain the first decrypted result; and to calculate according to the authorization code, the authenticating data and the public key of hardware wallet to obtain the device hash value;
  in Embodiment 3, the decrypting and calculating sub-unit configured to calculate according to the authorization code, the authenticating data and the public key of hardware wallet to obtain the device hash value specifically is that the decrypting and calculating sub-unit configured to join the authorization code, the authenticating data and the public key of hardware wallet successively to obtain the joint value, execute hash calculation on the joint value to obtain the device hash value;
  a first determining unit which is configured to determine whether the device hash value equals the first decrypted result, if yes, authentication is successful, and to trigger the storing and setting module 38; otherwise, the authentication is unsuccessful, and to return authentication unsuccessful information, and to trigger the first determining module 30;
the second authenticating module 39 includes
  a calculating unit which is configured to calculate on the cipher text of device hash value which is in the binding instruction according to the authorization code to obtain the first decrypted result; and to calculate according to the authorization code, the authenticating data and the public key of hardware wallet to obtain the device hash value;
  in Embodiment 3, the realization process of the calculating unit in the first authenticating module 37 is the same as the calculating unit in the second authenticating module 39, more details will not be given herein;
  the second determining unit which is configured to determine whether the device hash value equals the first decrypted result, if yes, the authentication is successful, to trigger the determining and storing module; otherwise, the authentication is unsuccessful, and to return authentication unsuccessful information to the terminal, and to trigger the first determining module.

The above are only preferred embodiments of the present disclosure, however, the scope of protection of the present disclosure is not limited thereto. Any modification or substitution that can be easily envisaged by those of skill in the art within the technical scope disclosed by the present disclosure is intended to be included within the protection scope of the present disclosure. Therefore, the scope of protection of the present disclosure should be based on the scope of protection of the appended claims.

The invention claimed is:

1. A method for binding and authorizing a hardware wallet, wherein the method comprises the following steps:
  S1) determining, by the hardware wallet, a type of an instruction when the instruction, sent from a terminal, is received by the hardware wallet, executing step S2 if the instruction is a checking and binding state instruction; executing step S5 if the instruction is a generating authorization code instruction; or executing step S7 if the instruction is a binding instruction;
  S2) determining, by the hardware wallet, a value of an authenticating data existence flag which is stored in the hardware wallet, setting a binding object as null if the value of the authenticating data existence flag is a first preset data, and setting an authorization state as permitting to generate authorization code, and executing step S4; and executing step S3 if the value of the authenticating data existence flag is a second preset data;
  S3) checking, by the hardware wallet, whether authenticating data in the checking and binding instruction is the same as the authenticating data which is stored in the hardware wallet, if yes, setting the binding object as a terminal corresponding to the hardware wallet, and executing step S4; otherwise, setting the binding object as other terminal, and executing step S4;
  S4) organizing, by the hardware wallet, command response data according to the binding object and a stored hardware wallet certificate, and returning the command response data to the terminal, and returning to step S1;
  S5) determining, by the hardware wallet, whether the authorization state is the permitting to generate state code, if yes, executing step S6; otherwise, returning error information to the terminal, and returning to step S1;

S6) generating, by the hardware wallet, an authorization code, caching and displaying the authorization code, setting the authorization state as the hardware wallet cannot generate the authorization code anymore, setting hardware wallet state as unbinding, returning success information to the terminal, and returning to step S1;

S7) determining, by the hardware wallet, whether the hardware wallet state is unbinding, if yes, obtaining the cached authorization code, executing step S8; otherwise, obtaining the stored authorization code, and executing step S10;

S8) authenticating, by the hardware wallet, the binding instruction by using the authorization code obtained, executing step S9 if the binding instruction is authenticated successfully; returning authentication unsuccessful information to the terminal if the binding instruction is authenticated unsuccessfully, and returning to step S1;

S9) storing, by the hardware wallet, the authenticating data and the cached authorization code which are in the binding instruction, and setting the value of the authenticating data existence flag as the second preset data, returning authorization successful information to the terminal, and returning to step S1;

S10) authenticating, by the hardware wallet, the binding instruction by using the authorization code obtained, executing step S11 if the binding instruction is authenticated successfully; returning authentication unsuccessful information to the terminal if the binding instruction is authenticated unsuccessfully, and returning to step S1; and S11) determining, by the hardware wallet, whether a currently connected terminal is the terminal corresponding to the hardware wallet according to the binding instruction, if yes, returning authorization successful information to the terminal, and returning to step S1; otherwise, storing the authenticating data which is in the binding instruction, and setting the value of the authenticating data existence flag as the second preset data, and returning authorization successful information to the terminal, and returning to step S1.

2. The method as claimed in claim 1, wherein the step 39 and the step S11 further comprise setting, by the hardware wallet, a binding state code between the hardware wallet and the terminal as a preset value;

the step S1 further includes determining, by the hardware wallet, whether the binding state code between the hardware wallet and the terminal is the preset value when the hardware wallet determines that the received instruction sent from the terminal is a signing instruction, if yes, executing signature according to the signing instruction, and returning to the step S1; otherwise, returning error information to the terminal.

3. The method as claimed in claim 1, wherein the authorization code generated by the hardware wallet comprises:
generating, by the hardware wallet, a random number of a preset length, and generating a retrieval code according to the random number and a preset character coding table; and joining values of the retrieval code successively, so as to obtain the authorization code.

4. The method as claimed in claim 1, wherein before step 37, the method further comprises
determining, by the hardware wallet, whether the binding instruction is legitimate, if yes, executing step S7; otherwise, returning error information to the terminal, and returning to step S1.

5. The method as claimed in claim 4, wherein determining, by the hardware wallet, whether the binding instruction is legitimate specifically comprises that the hardware wallet determines whether data on a third byte in the binding instruction is a first preset value or a second preset value, and whether data on a fourth byte is a third preset value, if both yes, the binding instruction is legitimate; otherwise, the binding instruction is illegitimate.

6. The method as claimed in claim 5, wherein the step 311 includes that the hardware wallet determines whether data on the third byte in the binding instruction is the second preset value, if yes, returning authorization successful information to the terminal, and returning to the step S1; otherwise, storing authenticating data which is in the binding instruction, setting the value of the authenticating data existence flag as the second preset data, and returning authorization successful information to the terminal, and returning to the step S1.

7. The method as claimed in claim 1, wherein setting the hardware wallet state as unbinding specifically is that the hardware wallet sets the an authorization code flag as a preset value;

the step S7 comprises that the hardware wallet determines whether the authorization code flag is a preset value, if yes, obtaining the cached authorization code, and executing the step S8; otherwise, obtaining the stored authorization code, and executing step S10.

8. The method as claimed in Claire 1, wherein authenticating, by the hardware wallet, the binding instruction by using the authorization code obtained comprises the following steps:

A1) calculating, by the hardware wallet, a cipher text of a terminal hash value in the binding instruction according to the authorization code so as to obtain a first decrypted result; calculating according to the authorization code, the authenticating data, and a public key of the hardware wallet so as to obtain a device hash value; and A2) determining, by the hardware wallet, whether the device hash value equals the first decrypted result, if yes, the binding instruction is authenticated successfully, otherwise, the binding instruction is authenticated unsuccessfully.

9. The method as claimed in claim 8, wherein the step A1 comprises the following steps:

b1) executing, by the hardware wallet, a hash calculation on the authorization code so as to obtain a first hash result, executing another hash calculation on a preset constant so as to obtain a second hash result, and executing an xor calculation on the first hash result and the second hash result, so as to obtain an xor result;

b2) making, by the hardware wallet, the first 16 bytes of the xor result as an initial vector of encryption and decryption; executing a key consultation by using the stored authenticating data and the public key of the hardware wallet according to a key consultation algorithm so as to obtain a device cipher text and storing the device cipher text, and making first 16 bytes of the device cipher text as a first key; and b3) decrypting, by the hardware wallet, the cipher text of the terminal hash value in the binding instruction by using the first key and the initial vector so as to obtain a first decrypted result; calculating according to the authorization code, the authenticating data, and the public key of the hardware wallet so as to obtain the device hash value.

10. The method as claimed in claim 9, wherein said calculating according to the authorization code, the authenticating data, and the public key of the hardware wallet so as to obtain the device hash value specifically is joining the authorization code, the authenticating data, and the public key of the hardware wallet successively, so as to obtain a joint value; and executing the hash calculation on the joint value so as to obtain the device hash value.

\* \* \* \* \*